United States Patent Office 2,828,321
Patented Mar. 25, 1958

2,828,321

KETO ALIPHATIC ACID ESTERS AND METHOD OF PREPARING THE SAME

Milon W. Bullock, Pearl River, N. Y., assignor to American Cyanamid Company, New York, N. Y., a corporation of Maine No Drawing. Application October 19, 1953
Serial No. 387,025

14 Claims. (Cl. 260—399)

This invention relates to new organic compounds. More particularly, it relates to thiosubstituted keto aliphatic acid esters and methods of preparing the same.

In my copending application, Serial Number 284,205, filed April 24, 1952, I describe the preparation of omega-[3-(1,2-dithiolamyl)] aliphatic acids, salts and esters thereof. These compounds were described as oxidation inhibitors and growth supporting factors for certain microorganisms including *S. facelis*, *Tetrahymena geleii* and some Corynebacterium species. Also, disclosed in the said application was the use of thiosubstituted keto aliphatic acid esters as intermediates in the preparation of new active compounds. The present application is a continuation-in-part of application, Serial Number 284,205 and describes and claims the said intermediates.

The new compounds of the present invention may be illustrated by the following structural formula:

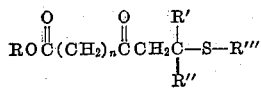

in which R is a lower alkyl radical, R' and R'' are hydrogen or lower alkyl radicals, R''' is an alkyl, monocyclic aryl substituted lower alkyl or lower fatty acid acyl radical and $n$ is a whole number less than 7. The alkyl radicals represented by R, R' and R'' can be methyl, ethyl, propyl, butyl, isobutyl, amyl, etc. R''' can be radicals such as methyl, ethyl, propyl, butyl, decyl, dodecyl, heptadecyl, octadecyl, benzyl, phenethyl, acetyl, propionyl butyryl, and the like.

The compounds of the present invention are, in general, liquids at room temperature, although in some cases they are comparatively low melting crystalline solids. They are immiscible with water and soluble or miscible with general organic solvents such as acetone, chloroform, ether, and the like.

To prepare the compounds of the present invention it is preferred that unsaturated aliphatic acid esters such as those described in by copending application, Serial Number 387,024, filed October 19, 1953, be used as intermediates. These acid esters are reacted with thioacids such as thioacetic acid, thiopropionic acid, thiobutyric acid or a mercaptan such as benzyl mercaptan, methyl mercaptan, ethyl mercaptan, propyl mercaptan, decyl mercaptan, dodecyl mercaptan, heptadecyl mercaptan, octadecyl mercaptan, and the like.

The reaction to prepare the compounds of the present invention may be illustrated as follows:

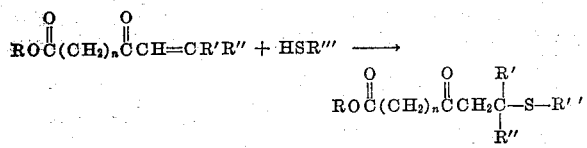

in which R, R', R'', R''' and $n$ are as heretofore defined.

The reaction can be carried out by slowly adding the thioacid or mercaptan to the unsaturated acid ester. The reaction is spontaneous and exothermic when using thioacids, however, to insure complete reaction it is usually desirable to heat the reaction mixture for a short period of time. When mercaptans are used it is advantageous to use an alkaline catalyst such as sodium hydride or sodium ethoxide. The temperature at which the reaction is run is not critical. However, I prefer a temperature of 30° to 120° C.

When the reaction is complete the catalyst (if present) is removed by washing with water and the excess of mercaptan or thioacid is distilled off under reduced pressure. The product can then be purified by distillation under reduced pressure. Alternatively, when the product is a solid it can be purified by crystallization from suitable solvents.

The following examples illustrate in detail the process of the present invention wherein thiosubstituted keto acid esters are prepared.

Example 1

In a 250 ml. round bottom flask equipped with a condenser was placed 100 g. (0.544 mole) of ethyl-$\Delta^7$,6-ketooctenoate. The flask was cooled in an ice bath and 40 ml. (0.57 mole) of thioacetic acid was poured slowly down the condenser. The reaction mixture was shaken frequently during the addition. The resulting solution was warmed on the steam bath twenty minutes and the excess thioacetic acid distilled off under the reduced pressure of an aspirator. The product was distilled through a six inch vacuum jacketed Vigreux Column. The fractions were collected as follows:

| No. | Boiling Point | Pressure, mm. | Weight, g. | $n_D$ |
|---|---|---|---|---|
| 1 | 66–110 | 0.1 | 12 | |
| 2 | 110–138 | .1–.03 | 9.2 | |
| 3 | 138–148 | .03 | 8.0 | |
| 4 | 148–150 | .03 | 44.0 | $1.4790^{23}$ |
| 5 | 150–148 | .03 | 62.0 | $\{1.4790^{23}, 1.4798^{20}\}$ |

An additional 20.9 g. of product was obtained from fractions 1, 2 and 3 by adding more thioacetic acid and redistilling, bringing the total yield to 128.9 (0.496 mole), 91.2%. The product, ethyl 8-acetylthio-6-ketooctanoate had a melting point of 10° and has $d^{20}$ 1.094.

Example 2

To 8.0 g. (0.0435 mole) of ethyl-$\Delta^7$,6-ketooctenoate contained in a 50 ml. flask equipped with a condenser was added 3.62 g. (0.048 mole) of thioacetic acid. The reaction was rapid and exothermic. The excess thioacetic acid was distilled off under the reduced pressure of an aspirator. The product obtained was identical with that of Example 1.

Example 3

Thirty-five ml. of thioacetic acid was added to 60 g. of ethyl-$\Delta^6$,5-ketoheptenoate which had partially polymerized from long storage. After the exothermic reaction had subsided, the mixture was warmed on the steam bath one hour. The excess thioacetic acid was distilled off and the residue purified by vacuum distillation. The fraction distilling 143°–145° at 0.05 mm. and weighing 32 g. was collected as product. The product crystallized on storage in the cold room. The long white needles were filtered from a small amount of oil and washed generously with cold ligroin. The pure crystals of ethyl-7-acetylthio-5-ketoheptanoate, melting point 18.5°. This material had $n_D^{20}$ 1.4801 and $d^{20}$ 1.110.

Example 4

One hundred twenty-nine and three-tenths grams (0.69 mole) of the ethyl-$\Delta^7$,6-ketononenoate were placed in a 250 ml. round bottom flask equipped with condenser and dropping funnel. The flask was swirled while 55 ml. (0.705 mole) of thioacetic acid was added to 5 ml. portions. The reaction was sufficiently exothermic that the temperature rose to approximately 100°. The reaction mixture was heated on the steam bath one-half hour and the excess thioacetic acid distilled off under the reduced pressure of an aspirator. The product was vacuum distilled through a six inch vacuum jacketed Vigreux Column. After a fairly large forerun, which was two phases (the upper phase was a hydrocarbon impurity which was formed by the polymerization of the propylene during the condensation reaction), the remainder of the product distilled 140° at 0.05 mm. and had $n_D^{20}$ 1.4772, $d^{20}$ 1.071. An additional 13.5 g. of product was obtained by distilling the lower phase of the forerun bringing the total yield of pure ethyl-8-acetylthio-6-ketononanoate to 141.4 g. (0.515 mole), 75%.

*Example 5*

In a liter pot were placed 185 g. (1.5 moles) of benzyl mercaptan and about 50 mg. of sodium hydride. After most of the sodium hydride had reacted 244 g. (1.43 moles) of methyl-Δ⁷,6-ketooctenoate was added. After the exothermic reaction had subsided the reaction mixture was heated on the steam cone one hour. The reaction mixture was cooled, diluted with an equal volume of chloroform and washed once with water. The chloroform solution was dried over sodium sulfate and the solvent distilled. Distillation yielded 303.4 g. (1.03 moles), 72% of methyl-8-benzylthio-6-ketooctenoate, boiling point 175° at 0.1 mm., $n_D^{20}$ 1.5291, $d^{20}$ 1.100.

*Example 6*

In a 250 ml. flask was placed 42.5 g. (0.343 mole) of benzylmercaptan and 100 mg. of sodium hydride. After most of the sodium hydride had reacted 60 g. (0.303 mole) of ethyl-Δ⁷,6-ketononenoate was added. The reaction mixture was warmed on the steam bath one hour and left standing at room temperature over the weekend. The reaction mixture was dissolved in 250 ml. ether and the ether solution washed with 5% sodium hydroxide, water and saturated sodium bicarbonate solution. Distillation of the dried sodium sulfate left 93 g. of oil which was purified under reduced pressure. The fraction distilling 180° at 0.07 mm. was collected as product. The yield of ethyl-8-benzylthio-6-ketononanoate was 75.5 g. (0.234 mole), 77.4%. The product had $n_D^{20}$ 1.5192 and $d^{20}$ 1.059.

*Example 7*

In a 300 ml. round bottom flask equipped with condenser was placed 182 g. (1.07 moles) of methyl-Δ⁷,6-ketooctenoate. The reaction flask was swirled and cooled in a water bath while 93.5 g. (1.23 moles) of thioacetic acid was added in small portions through the condenser. The reaction mixture was left standing two hours and the product vacuum distilled. The product, methyl-8-acetylthio-6-ketooctanoate distilled 138°–140° at 0.1 mm. The yield was 250 g. (1.015 mole), 94.6%. The material had $n_D^{28.5}$ 1.4810 before it crystallized to a white solid having melting point 37°.

*Example 8*

Sixty-two grams (0.82 mole) of thioacetic acid was stirred into 115 g. (0.543 mole) of ethyl Δ⁷,6-keto-8-methylnonenoate. The reaction mixture was slowly warmed to 105° and maintained at this temperature for thirty minutes. The product was purified by vacuum distillation. The fraction distilling 118°–140° at 0.1–0.05 mm. was collected as product. The yield was 130 g. (0.452 mole), 83.5%. A sample was crystallized from ligroin at low temperature and redistilled to obtain an analytical sample. This material, ethyl 8-acetylthio-6-keto-8-methylnonanoate, had a boiling point of 130° at 0.05 mm., had $n_D^{20}$ 1.4770 and melting point 3°.

*Example 9*

In a 500 ml. round bottom flask equipped with condenser were placed 100 g. (1.73 moles) of ethyl mercaptan and approximately 200 mg. of sodium hydride. After a few minutes the flask was cooled in an ice bath and 170 g. (1 mole) of methyl Δ⁷,6-ketooctenoate was added to the mixture. After the initial exothermic reaction subsided, the reaction mixture was heated at reflux temperature four hours and the excess ethyl mercaptan distilled off. The product was purified by distillation. The fraction distilling 125–126° at 0.15 mm. was collected as product. The pure methyl 8-ethylthio-6-ketooctanoate had $n_D^{20}$ 1.4771 and $d^{20}$ 1.051. The yield was 212.8 g. (0.92 mole), 92%.

*Example 10*

In a liter flask were placed 200 g. (0.99 mole) of dodecyl mercaptan and about 100 mgs. of sodium hydride. After a few minutes 179.3 g. (0.98 mole) of ethyl Δ⁷,6-ketooctenoate was added. The reaction mixture was heated on the steam bath two hours and left standing overnight. The crystals were filtered off and washed with ligroin. The yield of the crude crystals was 98 g. melting at 60–62°. The product melted 64–65° after recrystallization from ligroin. More product was obtained by distilling the material which did not crystallize. The product distilled 168–172° at 0.09 mm. and solidified on cooling. The total yield of purified ethyl 8-dodecylthio-6-ketooctanoate was 198 g. (0.512 mole), 50%.

I claim:

1. Compounds having the general formula

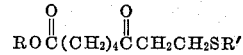

in which R is a lower alkyl radical and R' is selected from a group consisting of lower alkanoyl, benzyl, and alkyl radicals of 1 to 12 carbon atoms.

2. A lower alkyl 8-lower alkanoylthio-6-ketooctanoate.
3. A lower alkyl 8-acetylthio-6-ketooctanoate.
4. Ethyl 8-acetylthio-6-ketooctanoate.
5. Methyl 8-ethylthio-6-ketooctanoate.
6. Methyl 8-benzylthio-6-ketooctanoate.
7. Methyl 8-acetylthio-6-ketooctanoate.
8. A method of preparing compounds having the general formula:

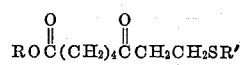

in which R is a lower alkyl radical and R' is selected from a group consisting of lower alkanoyl, benzyl, and alkyl radicals of 1 to 12 carbon atoms, which comprises reacting a compound having the formula

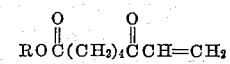

in which R is as defined above with a compound having the formula $$HSR^1$$

in which R' is as defined above.

9. A method of preparing a lower alkyl ester of 8-lower alkanoylthio-6-ketooctanoic acid which comprises reacting a lower alkyl ester of Δ⁷,6-ketooctenoate with a lower alkanoylthiol acid.

10. A method of preparing a lower alkyl ester of 8-acetylthio-6-ketooctanoic acid which comprises reacting a lower alkyl ester of Δ⁷,6-ketooctenoate with thioacetic acid.

11. A method of preparing ethyl 8-acetylthio-6-ketooctanoate which comprises reacting ethyl Δ⁷,6-ketooctenoate with thioacetic acid.

12. A method of preparing methyl-8-benzylthio-6-ketooctanoate which comprises reacting methyl Δ⁷,6-ketooctenoate with benzyl mercaptan.

13. A method of preparing methyl-8-acetylthio-6-ketooctanoate which comprises reacting methyl $\Delta^7$,6-ketooctenoate with thioacetic acid.

14. A method of preparing methyl-8-ethylthio-6-ketooctanoate which comprises contacting methyl $\Delta^7$,6-ketooctanoate with ethanethiol in the presence of sodium hydride.

References Cited in the file of this patent

UNITED STATES PATENTS

| 2,390,099 | Harmon | Dec. 4, 1945 |
| 2,531,602 | Bell | Nov. 28, 1950 |
| 2,568,648 | McCool | Sept. 18, 1951 |
| 2,759,005 | Starker et al. | Aug. 14, 1956 |

FOREIGN PATENTS

| 867,394 | Germany | Feb. 16, 1953 |

OTHER REFERENCES

"Svensk, Kem. Tid." 55, 168–171 (1943), "Darstellung von B-Merkaptoisobuttersäure," by E. Larsson.

Gilman: Organic Chemistry, 2nd edition, 1943, vol. 1, pages 638, 639, 936.

Bullock et al.: Journal of the American Chemical Society, vol. 74, 3455 (1952).